United States Patent [19]

Murakami

[11] Patent Number: 5,147,922

[45] Date of Patent: Sep. 15, 1992

[54] RESIN COMPOSITION

[75] Inventor: Tomoyoshi Murakami, Chiba, Japan

[73] Assignee: Idemitsu Kosan Co., Ltd., Tokyo, Japan

[21] Appl. No.: 570,883

[22] Filed: Aug. 22, 1990

[30] Foreign Application Priority Data

Sep. 4, 1989 [JP] Japan .................... 1-227597

[51] Int. Cl.$^5$ .............................................. C08K 3/04
[52] U.S. Cl. ................................... 524/496; 524/413; 524/462; 524/502; 524/611
[58] Field of Search .............. 524/413, 462, 406, 502, 524/611

[56] References Cited

FOREIGN PATENT DOCUMENTS 2220416  1/1990  United Kingdom .

OTHER PUBLICATIONS

Chemical Abstracts, vol. 111, No. 22, Nov. 27, 1989, Abstract No. 196091h, "Self-lubricating wear-resistant poly(phenylene sulfide) compositions", p. 49; abstract of JP-1-038472 (Sumitomo) Feb. 8, 1989.

*Primary Examiner*—Paul R. Michl
*Assistant Examiner*—Edward Cain
*Attorney, Agent, or Firm*—Frishauf, Holtz, Goodman & Woodward

[57] ABSTRACT

A resin composition comprising (A) a polycyanoarylether consisting essentially of the repeating unit represented by the following general formula (I)

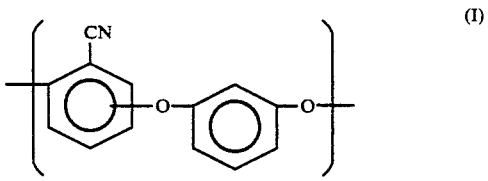

and having a reduced viscosity of at least 0.6 dl/g as measured at 60° C. in p-chlorophenol at a concentration of 0.2 g/dl and (B) a carbonized phenolic resin is suitable for sliding parts of electric and electronic instruments and machines because it exhibits excellent abrasion resistance and reduces the damage to counterparts. The sliding characteristics of the resin composition is further increased by addition of a non-fibrous solid lubricant.

20 Claims, No Drawings

RESIN COMPOSITION

BACKGROUND OF THE INVENTION (a) Field of the Invention

The present invention relates to a polycyanoarylether resin composition having an excellent abrasion resistance, particularly, to a resin composition which is prepared by mixing at least a carbonized phenolic resin with a polycyanoarylether. Because of its excellent abrasion resistance and sliding characteristic, the resin composition has the advantage that when used as a sliding part, the damage to the counterparts, particularly to hard counterparts, may be reduced. The resin composition, therefore, is useful as a material for various molded articles including sliding components of electric and electronic instruments and machines.

(b) Description of the Related Art

Polycyanoarylether resins are known as engineering resins having excellent heat resistance, mechanical properties, electrical properties, flame resistance, chemical resistance, etc. (Japanese Patent Application Kokai Koho (Laid-open) No. 62-223226). Although polycyanoarylethers have the above-described excellent properties and high PV value, they have a defect that they themselves do not have sufficient abrasion resistance, particularly, that they do not exhibit satisfactory sliding characteristic. Therefore, there have been made attempts to improve their characteristics by addition of fluorocarbon resins, graphite or the like. For instance, fluorocarbon resins are known to be effective mainly in reducing friction coefficient, and graphite and molybdenum disulfide are known to be effective in improving abrasion resistance.

SUMMARY OF THE INVENTION

I have found that when both polytetrafluoroethylene and graphite or the like are mixed with polycyanoarylethers, the resulting resin compositions exhibit excellent sliding characteristic with soft counterparts, such as aluminum, without damaging the counterparts. However, it has been also found that in cases where the counterparts are of hard materials, the abrasion resistance of the resin compositions improved by the addition of graphite or molybdenum disulfide is still insufficient, thereby restricting the use of the resin compositions as the materials for sliding parts of electric and electronic instruments and machines and other parts adjoining the sliding parts.

The present invention has been made in view of the above-described circumstances, and the object of the present invention is to provide a polycyanoarylether resin composition which has the advantage of exhibiting excellent fundamental properties characteristic to polycyanoarylethers and, as well, having excellent abrasion resistance and sliding characteristic whereby the damage to counterparts, particularly to hard counterparts, can be reduced.

My research for achieving the above object resulted in the finding that mixing a specified resin ingredient, namely a carbonized phenolic resin, with a polycyanoarylether having a specified repeating unit and a reduced viscosity of not less than a specified value brings about the resulting resin composition with a higher abrasion resistance as compared with the conventional addition of graphite or molybdenum disulfide, and that mixing further a non-fibrous solid lubricant improves the abrasion resistance and other properties furthermore. My further researches resulted in the finding that mixing a fibrous reinforcing material, particularly a fiber which exhibits relatively good sliding characteristics when used at high temperature, to the improved resin composition described above improves the properties of the resin composition, including heat resistance, without reducing abrasion resistance.

On the basis of the above-described findings, I have completed the present invention.

That is, the present invention provides a resin composition, comprising; (A) a polycyanoarylether consisting essentially of the repeating unit represented by the following general formula (I)

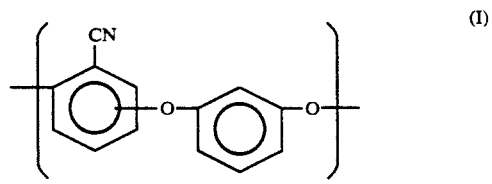

and having a reduced viscosity of at least 0.6 dl/g as measured at 60° C. in p-chlorophenol at a concentration of 0.2 g/dl and (B) a carbonized phenolic resin.

A resin composition having further improved properties, including abrasion resistance, can be obtained by mixing a non-fibrous solid lubricant with the resin composition of the present invention.

Further, a resin composition having further improved properties, including heat resistance, can be obtained by mixing a fibrous reinforcing material with the resin composition of the present invention.

DESCRIPTION OF THE PREFERRED EMBODIMENTS

Any polycyanoarylether may be used in the present invention so long as it contains the repeating unit represented by the general formula (I) as the main structural component. Although the ratio of the repeating unit represented by the general formula (I) cannot be uniformly defined because it varies depending on the kind of the polycyanoarylether, the preferred polycyanoarylether generally contains not less than 90% by weight of the repeating unit represented by the general formula (I), and the particularly preferred is a homopolymer consisting of the repeating unit represented by the general formula (I). Other repeating units which may be contained in the polycyanoarylether are those represented by the following general formulas (II) and (III):

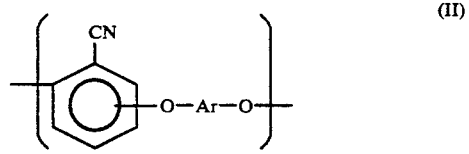

wherein Ar represents

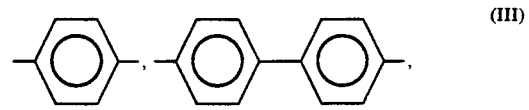

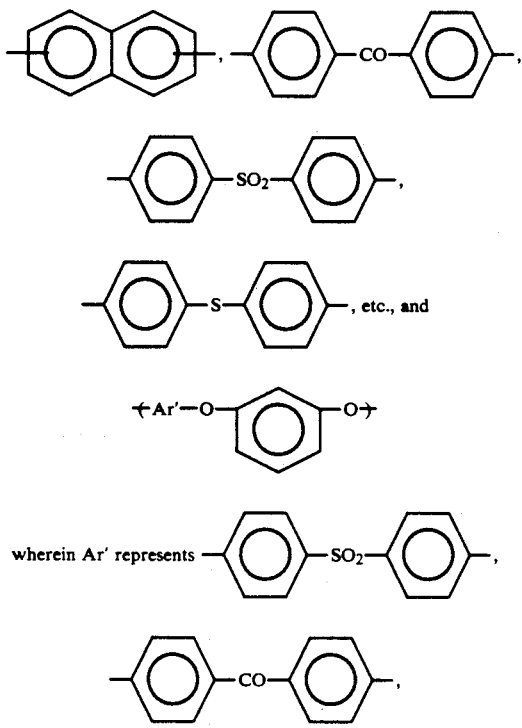

etc. These repeating units represented by the general formula (II) and (III) may be contained in the polycyanoarylether in a small amount, preferably in an amount of less than 10% by weight of the polycyanoarylether. The presence of not less than 10% by weight of these repeating units in the polycyanoarylether is undesirable because it may damage the characteristics of the polycyanoarylether.

The polycyanoarylether to be used in the present invention may be prepared, for example, by allowing a dihalogenobenzonitrile represented by the following general formula (IV):

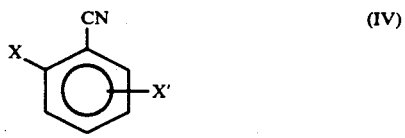

wherein each of X and X' represents a halogen atom, and resorcinol to react with each other in an approximately equimolar ratio, in the presence of an alkali metal carbonate, in an aprotic polar solvent, and in an atmosphere of an inert gas.

Some examples of the alkali metal carbonate which may be used include carbonates of alkali metals, such as sodium carbonate, potassium carbonate, lithium carbonate, cesium carbonate, and rubidium carbonate, and hydrogencarbonates of alkali metals corresponding to the carbonates of alkali metals. The amount of the alkali metal carbonate used may be varied depending on the conditions, and it is, generally, from 1.0 to 1.3 times equivalent of resorcinol, particularly preferably, slightly in excess.

Some examples of the aprotic polar solvent which may be used include N-methylpyrrolidone, 1,3-dimethylimidazolidinone, dimethylsulfoxide, dimethylformamide, and dimethylacetamide, and the amount of the aprotic polar solvent used is not particularly limited, so long as it is sufficient for dissolving the compound represented by the general formula (IV) and resorcinol.

Chain-extending agents or end-terminators, for example, fluorobenzonitrile, may be added prior to or during polymerization reaction.

Other reaction conditions depend on various circumstances and cannot be determined uniformly, but generally, the reaction temperature is not lower than 200° C., preferably from 200° to 210° C., and reaction time is from 2 to 6 hours.

Thus prepared various polycyanoarylethers may be used in the present invention individually or in a combination of two or more of them, for example, as a mixture, provided that the polycyanoarylethers to be used individually or the mixtures of the polycyanoarylethers to be used in combination have a reduced viscosity [η sp/C] of at least 0.6 dl/g, preferably from 0.6 to 1.5 dl/g, as measured at 60° C. in p-chlorophenol at a concentration of 0.2 g/dl.

If the reduced viscosity [η sp/C] measured under the above-described conditions is less than 0.6 dl/g, the properties of the resin composition, such as strength or heat resistance, will be insufficient, and the object of the present invention cannot be accomplished.

The carbonized phenolic resin is prepared by heating resol resin or a mixture of novolac resin and hardeners such as hexamethylenetetramine to obtain a cured resin and carbonizing the cured resin in an inert atmosphere, and generally, consists of glassy carbonaceous particles.

The particularly preferred are spherical or granular carbonaceous fine particles which are prepared, for example, by subjecting a granular or powdery phenolformaldehyde resin having a methanol solubility of not more than 20% by weight to heat-treatment in a non-oxidizing atmosphere at a temperature of not lower than 500° C., and contain spherical primary particles having a bulk density of from 0.6 to 0.8 g/cc, a gravity of from 1.3 to 1.6, a specific surface of not more than 250 m²/g, and a particle size of from 0.1 to 150 μm and secondary agglomerates thereof, at least 50% by weight of which are passable through a sieve of 100 Tyler mesh, and more preferably, these granular carbonaceous fine particles have a mean particle size of from 15 to 20 μm. These granular carbonaceous fine particles have been disclosed in Japanese Patent Application Kokai Koho (Laid-open) No. 63-128058 and Japanese Patent Application Kokai Koho (Laid-open) No. 63-130666.

Other examples of the carbonized phenolic resin available in the market are those produced by Kanebo Co., Ltd. and having a trade-name of BELL PEARL series, which may be used particularly suitably because of their easy availability. Some examples of the BELL PEARL series include BELL PEARL H-500, C-600, C-800, and C-2000, and the particularly preferred are BELL PEARL C-600 and C-2000.

These carbonized phenolic resins may be used individually or in a combination of two or more of them.

The non-fibrous solid lubricant to be used in the present invention may be selected from various ones known in the art.

Some examples of the non-fibrous solid lubricant which may be used include fluorocarbon resins, graphite, molybdenum disulfide, tungsten disulfide, lead oxide, graphite fluoride, talc, mica, antimony oxide, lead powder, copper powder, and bronze powder. Among these, the preferred are fluorocarbon resins, graphite, molybdenum disulfide, and tungsten disulfide, and the particularly preferred are fluorocarbon resins.

The fluorocarbon resins which may be used include various known ones. Some examples include a homopolymer or a copolymers of tetrafluoroethylene, copolymer of tetrafluoroethylene and hexafluoropropylene, a polymer of chlorotrifluoroethylene, and a polymer of vinylidene fluoride. Among these, the particularly preferred resin is polytetrafluoroethylene (PTFE).

These non-fibrous solid lubricants may be used individually or in a combination of two or more of them.

The non-fibrous solid lubricants of various shapes may be used in the present invention so long as they are of non-fibrous form (macroscopically non-fibrous form), but it is generally appropriate to use those having a mean particle size of from 0.1 to 50 μm, preferably from 1 to 20 μm.

If solid lubricants having a mean particle size of more than 50 μm are used, they may tend to damage the counterparts because of their poor dispersibility, and they may increase the anisotropy in the index of mold shrinkage, etc. or may impair the surface smoothness and surface appearance. On the other hand, if the mean particle size is too small, the melt viscosity of the resin composition increases, resulting in a poor molding processability, and the work efficiency may be decreased owing to scattering of powder.

In case the above-described fluorocarbon resins are used as the non-fibrous solid lubricant, the fluorocarbon resins preferably have a means particle size of approximately from 0.5 to 30 μm, particularly preferably from 5 to 20 μm.

A variety of fibrous reinforcing materials known in the art may be used in the present invention, and they may be used individually or in a combination of two or more of them. Generally, the preferred are those which exhibit relatively good sliding characteristic even when used at high temperature. The preferred examples include carbon fibers, aramid fibers, and potassium titanate fibers, and the particularly preferred are carbon fibers.

Various known carbon fibers including acrylonitrile carbon fibers, pitch carbon fibers, and cellulosic carbon fibers may be used.

The preferred carbon fibers to be mixed are those having a fiber diameter of approximately from 5 to 20 μm and a fiber length of approximately from 0.1 to 10 mm, and it is generally suitable to use chopped fiber of approximately 6 mm in length or roving, which have been generally used as the filler for resins.

Although the above-described carbon resins may be used as they are, it is also possible to use carbon fibers the surfaces of which have been treated with various treating agents, for example, those the surfaces of which have been treated by acid treatment, base treatment, partical acid treatment or metallizing treatment or those the surface of which have been treated, for example, with silane coupling agents or titanate coupling agents to increase their affinity with polycyanoarylether.

Some examples of the carbon fibers which are commercially available include TORAYCA T-300 (Tradename, produced by Toray Industries, Inc.), BESFIGHT HTA, BESFIGHT 1000 (Trade-name, produced by Toho Rayon Co., Ltd.), and KRECA M, KRECA C (Trade-name, produced by Kureha Chemical Industry Co., Ltd.).

Examples of the above-described aramid fibers which are generally used are wholly aromatic polyamide fibers. The fiber diameter thereof is not particularly limited, but those of approximately from 5 to 40 μm, preferably from 7 to 15 μm may be suitably used. The preferred fiber length thereof is approximately from 0.1 to 10 mm, and generally, chopped fiber having a fiber length of about 3 mm, which has been generally used as filler for resins, may be suitably used.

Although the above-described aramid fibers may be used as they are, it is also possible to use aramid fibers the surfaces of which have been treated with various treating agents, for example, those the surfaces of which have been treated with silane coupling agents or titanate coupling agents to increase their affinity with polycyanoarylethers.

Some examples of the aramid fibers which are commercially available include KEVLAR 49, PRD 49, and NORMEX (Trade-name, produced by E. I. Du Pont de Nemours and Company) and CORNEX (Trade-name, produced by Teijin Ltd.).

Various kinds of potassium titanate fibers may be used in the present invention, and those generally used have a mean fiber length of from 5 to 100 μm and a mean fiber diameter of from 0.05 to 2 μm, preferably a mean fiber length of from 20 to 50 μm and a mean fiber diameter of from 0.1 to 0.5 μm.

Although the above-described potassium titanate fibers may be used as they are, it is also possible to use potassium titanate fibers the surfaces of which have been treated with various treating agents, for example, those the surfaces of which have been treated with silane coupling agents or titanate coupling agents to increase their affinity with polycyanoarylethers.

The potassium titanate fibers may be those which are commercially available, and some examples include TISMO D101 (Trade-name, produced by Otsuka Chemical Co., Ltd., Mohs hardness number: 4.0, mean fiber length: 20 μm, mean fiber diameter: 0.1 μm), and B-type potassium titanate fibers produced by Kuboda, Ltd. (Mohs hardness number: 4.0, mean fiber length: 45 μm, mean fiber diameter: 0.5 μm).

In the resin composition of the present invention comprising the above-described polycyanoarylether and the above-described carbonized phenolic resin, it is desirable that the resin composition contains generally from 10 to 60% by weight, preferably from 20 to 50% by weight of the carbonized phenolic resin on the basis of the total of the amounts of the polycyanoarylether and the carbonized phenolic resin.

If the ratio of the carbonized phenolic resin is less than 10% by weight, the effect of addition thereof may be insufficient, and improvement of abrasion resistance and prevention of the damage to the counterparts may not be achieved sufficiently. On the other hand, if it exceeds 60% by weight, molding may be difficult, or strength may be decreased.

In the resin composition of the present invention comprising the above-described polycyanoarylether, the above-described carbonized phenolic resin, and the above-described non-fibrous solid lubricant, it is desirable that the resin composition contains from 5 to 40% by weight of the carbonized phenolic resin and from 5 to 30% by weight of the non-fibrous solid lubricant on the basis of the total of the amounts of the three ingredients, preferably from 10 to 30% by weight of the carbonized phenolic resin and from 10 to 20% by weight of the non-fibrous solid lubricant on the basis of the total of the amounts of the three ingredients.

If the ratio of the carbonized phenolic resin is less than 5% by weight, the effect of addition thereof may be insufficient, and improvement of abrasion resistance and prevention of the damage to the counterparts may not be achieved sufficiently. On the other hand, if it exceeds 40% by weight, strength may decrease. If the ratio of the non-fibrous solid lubricant is less than 5% by weight, the effect of addition thereof may be insufficient, and further improvement of abrasion resistance and further prevention of the damage to the counterparts may not be achieved sufficiently. On the other hand, if it exceeds 30% by weight, the dispersibility of the non-fibrous solid lubricant may be poor, thereby causing often a decrease in sliding characteristic or strength.

In the resin composition of the present invention comprising the above-described polycyanoarylether, the above-described carbonized phenolic resin, the above-described non-fibrous solid lubricant, and the above-described fibrous reinforcing material, it is desirable that the resin composition contains generally from 5 to 30% by weight of the carbonized phenolic resin, from 5 to 30% by weight of the non-fibrous solid lubricant, and from 10 to 40% by weight of the fibrous reinforcing material on the basis of the total of the amounts of the four ingredients, preferably from 10 to 20% by weight of the carbonized phenolic resin, from 10 to 20% by weight of the non-fibrous solid lubricant, and from 20 to 30% by weight of the fibrous reinforcing material on the basis of the total of the amounts of the four ingredients.

If the ratio of the carbonized phenolic resin is less than 5% by weight, the effect of addition thereof may be insufficient, and improvement of abrasion resistance and prevention of the damage to the counterparts may not be achieved sufficiently. On the other hand, if it exceeds 30 % by weight, strength may decrease. If the ratio of the non-fibrous solid lubricant is less than 5% by weight, the effect of addition thereof may be insufficient, and further improvement of abrasion resistance and further prevention of the damage to the counterparts may not be achieved sufficiently. On the other hand, if it exceeds 30% by weight, the dispersibility of the non-fibrous solid lubricant may be poor, thereby causing often a decrease in sliding characteristic or strength. If the ratio of the fibrous reinforcing material is less than 10% by weight, the effect of addition thereof may be insufficient, and improvement of properties such as heat resistance may not be achieved sufficiently. On the other hand, if it exceeds 40% by weight, there may occur difficulty in molding operation, the surfaces of the molded articles may tend to be rough, and the counterparts may tend to be damaged.

To the resin composition of the present invention, various known additive ingredients other than the above-described ingredients, for example, stabilizing agents such as antioxidants and UV stabilizer, anti-static agents, inorganic fillers, and agents for improving molding processability such as lubricants, colorants, untackifiers, and release agents, or other polymer ingredients may also be added at the time of preparation thereof or at the time of use thereof, for example at the time of processing thereof, according to demand.

The method of preparing the resin composition of the present invention is not particularly limited, and various methods including known methods may be used.

Generally, the resin composition of the present invention may be prepared by dry-mixing the above-described ingredients essential for the resin composition of the present invention (together with other additive ingredients according to circumstances) and melt-kneading the resulting mixture using, for example, a single-screw or twin-screw extruder. The appropriate melting temperature at the time of melt-kneading is generally from 340° C. to 380° C., preferably from 350° C. to 360° C. Kneading time is generally from 1 to 10 minutes, preferably from 2 to 5 minutes.

Thus obtained resin composition is molded into various molded matters such as pellets according to demand, and is then molded into desired shapes by injection molding, etc.

The resin composition of the present invention prepared as described above has excellent characteristics innate in polycyanoarylethers, such as excellent mechanical strength, and as well, exhibits excellent abrasion resistance and sliding characteristic while reducing the damage to counterparts, particularly to hard counterparts. Further, the resin composition of the present invention has other advantageous characteristics such as a high heat resistance enough to stand use at high temperature, and as well is inexpensive. As described above, the resin composition of the present invention is extremely advantageous in practical use and can be advantageously used as materials for various molded articles in a variety of industrial fields, including material for sliding parts in electric and electronic instruments and machines.

The present invention will be described in more detail with reference to the following Examples. These Examples, however, are not to be construed to limit the scope of the invention.

EXAMPLES 1 TO 8 AND COMPARATIVE EXAMPLES 1 TO 3

EXAMPLES 1 TO 8

In each of Examples 1 to 8, a polycyanoarylether consisting of the repeating unit represented by the following formula:

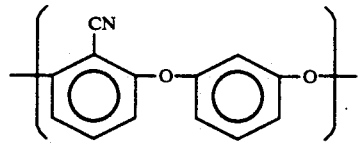

and having a reduced viscosity [$\eta$ sp/C] of 1.2 dl/g as measured at 60° C. in p-chlorophenol at a concentration of 0.2 g/dl and the carbonized phenolic resin shown in Table 1, or these ingredients and other ingredients shown in Table 1 (fluorocarbon resin, carbon fiber, and potassium titanate fiber) are dry-mixed in the ratios as shown in Table 1, and the resulting mixture was melt-kneaded at 355° C. using a twin-screw extruder (type: PCM-30 produced by Ikegai Corp.). The carbon fiber used, TORAYCA T300, was of roving form and was fed from the bent for feeding glass of the twin-screw extruder. The strand of each resin composition extruded from the extruder was cut to obtain pellets of resin composition.

The pellets were injection molded using an injection molding machine (type: IS45P produced by Toshiba Machine Co., Ltd.) to form a plate of 80×80×3.2 mm and test strips for HDT measurement. Further, a plate of 30×30×3.2 mm was cut from the above-described plate to obtain a test strip for measurement of sliding characteristic (abrasion characteristic).

Measurements of abrasion resistance, the amount of counterpart worn out, heat distortion temperature (HDT) were conducted according to the following testing methods.

a) abrasion characteristic (abrasion resistance, the amount of counterpart worn out)

Abrasion resistance and the amount of counterpart worn out were measured using a friction and wear testing machine (Type: EFM-III-F produced by Orientec Co., Ltd.) at a pressure of 7 kg/cm$^2$ and a velocity of 15 m/min using S45C as the counterpart.

b) heat distortion temperature (HDT)

Heat distortion temperature was measured according to ASTM D-648.

The results of these tests are shown in Table 2.

COMPARATIVE EXAMPLES 1 TO 3

The same procedure of Examples 1 to 8 was repeated with the exception that the raw material ingredients shown in Table 1 were used without using a carbonized phenolic resin.

The results of tests are shown in Table 2.

TABLE 1

|  | Examples | | | | | | | | Comparative Examples | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| Composition of ingredients (wt %) | | | | | | | | | | | |
| Polycyanoarylether | 50 | 80 | 50 | 50 | 70 | 50 | 40 | 40 | 50 | 50 | 60 |
| Carbonized phenolic resin (C-600) | 50 | — | — | — | 20 | 10 | — | — | — | — | — |
| Carbonized phenolic resin (C-2000) | — | 20 | 50 | 30 | — | — | 10 | 20 | — | — | — |
| Fluorocarbon resin (PTFE) | — | — | — | 20 | 10 | 20 | 20 | 20 | — | 20 | 10 |
| Carbon fiber | — | — | — | — | — | 20 | 30 | — | — | — | 30 |
| Potassium titanate fiber | — | — | — | — | — | — | — | 20 | — | — | — |
| Graphite | — | — | — | — | — | — | — | — | 50 | 30 | — |

Polytetrafluoroethylene (PTFE): LUBRON L-2 (trade-name) produced by Daikin Industries, Ltd. Mean particle size: 5 μm
Graphite: ACP-1000 (trade-name) produced by Nippon Kokuen Kogyo Co., Ltd. Mean particle size: 6 μm
Carbon fiber: T-300 (trade-name) produced by Toray Industries, Inc. Roving of 9 μm in diameter
Potassium titanate fiber: TISMO D101 (trade-name) produced by Otuka Chemical Co., Ltd. Mohs hardness number: 4.0 Mean fiber length: 20 μm
C-600: BELL PEARL C-600 (trade-name) produced by Kanebo, Ltd. Mean particle size: 17 μm Specific surface: 250 > (m$^2$/g)
C-2000: BELL PEARL C-2000 (trade-name) produced by Kanebo, Ltd. Mean particle size: 17 μm Specific surface: 10 > (m$^2$/g)

TABLE 2

| | Abrasion resistance $\frac{cm^2 \cdot sec}{kg \cdot m \cdot hr}$ | The amount of counterparts worn out (mg/hr) | Heat distortion temperature (HDT, °C.) |
| --- | --- | --- | --- |
| Examples | | | |
| 1 | 5 × 10$^{-5}$ | 0.1 | >300 |
| 2 | 11 × 10$^{-5}$ | 0.2 | 220 |
| 3 | 4 × 10$^{-5}$ | 0.1 | >300 |
| 4 | 2 × 10$^{-5}$ | <0.1 | 247 |
| 5 | 6 × 10$^{-5}$ | <0.1 | 213 |
| 6 | 1 × 10$^{-5}$ | <0.1 | >300 |
| 7 | 1 × 10$^{-5}$ | <0.1 | >300 |
| 8 | 3 × 10$^{-5}$ | 0.1 | 292 |
| Comparative Examples | | | |
| 1 | 11 × 10$^{-4}$ | 0.7 | >300 |
| 2 | 9 × 10$^{-5}$ | 0.4 | 298 |
| 3 | 4 × 10$^{-5}$ | 0.2 | >300 |

What is claimed is:

1. A resin composition, comprising: (A) a polycyanoarylether consisting essentially of the repeating unit represented by the following general formula (I)

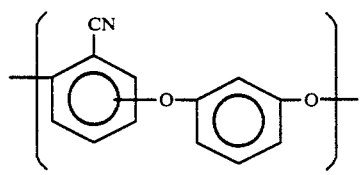

and having a reduced viscosity of at least 0.6 dl/g as measured at 60° C. in p-chlorophenol at a concentration of 0.2 g/dl and (B) a carbonized phenolic resin.

2. The resin composition as claimed in claim 1, wherein the carbonized phenolic resin is present in the resin composition in an amount of from 10 to 60% by weight on the basis of the total of the amounts of the polycyanoarylether and the carbonized phenolic resin.

3. The resin composition as claimed in claim 1, wherein the carbonized phenolic resin has a specific surface of not more than 250 m$^2$/g and a mean particle size of from 15 to 20 μm.

4. A resin composition, comprising: (A) a polycyanoarylether consisting essentially of the repeating unit represented by the following general formula (I)

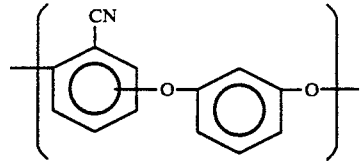

and having a reduced viscosity of at least 0.6 dl/g as measured at 60° C. in p-chlorophenol at a concentration of 0.2 g/dl, (B) a carbonized phenolic resin, and (C) a non-fibrous solid lubricant.

5. The resin composition as claimed in claim 4, wherein the carbonized phenolic resin is present in the resin composition in an amount of from 5 to 40% by weight and the non-fibrous solid lubricant is present in the resin composition in an amount of from 5 to 30% by weight on the basis of the total of the amounts of the polycyanoarylether, the carbonized phenolic resin, and the non-fibrous solid lubricant.

6. The resin composition as claimed in claim 4, wherein the carbonized phenolic resin has a specific surface of not more than 250 m²/g and a mean particle size of from 15 to 20 μm.

7. The resin composition as claimed in claim 4, wherein the non-fibrous solid lubricant is a fluorocarbon resin.

8. A resin composition, comprising: (A) a polycyanoarylether consisting essentially of the repeating unit represented by the following general formula (I)

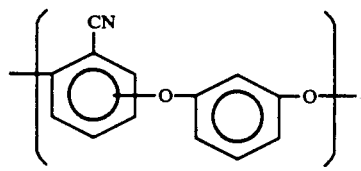
(I)

and having a reduced viscosity of at least 0.6 dl/g as measured at 60° C. in p-chlorophenol at a concentration of 0.2 g/dl, (B) a carbonized phenolic resin, (C) a non-fibrous solid lubricant, and (D) a fibrous reinforcing material.

9. The resin composition as claimed in claim 8, wherein the carbonized phenolic resin is present in the resin composition in an amount of from 5 to 30% by weight, the non-fibrous solid lubricant is present in the resin composition in an amount of from 5 to 30% by weight, and the fibrous reinforcing material is present in the resin composition in an amount of from 10 to 40% by weight on the basis of the total of the amounts of the polycyanoarylether, the carbonized phenolic resin, the non-fibrous solid lubricant, and the fibrous reinforcing material.

10. The resin composition as claimed in claim 8, wherein the carbonized phenolic resin has a specific surface of not more than 250 m²/g and a mean particle size of from 15 to 20 μm.

11. The resin composition as claimed in claim 8, wherein the non-fibrous solid lubricant is a fluorocarbon resin.

12. The resin composition as claimed in claim 8, wherein the fibrous reinforcing material is at least one selected from the group consisting of carbon fibers, aramid fibers, and potassium titanate fibers.

13. The resin composition as claimed in claim 2, wherein the polycyanoarylether consists essentially of not less than 90 wt. % of the repeating unit of formula (I) and less than 10 wt. % of at least one repeating unit of the following formulas (II) and (III):

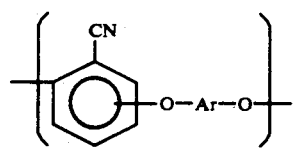
(II)

wherein Ar represents

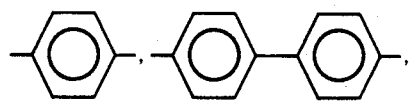
(III)

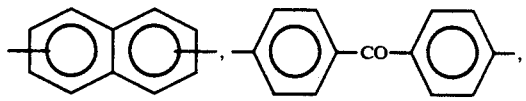

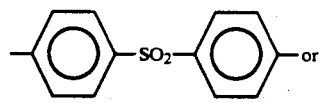

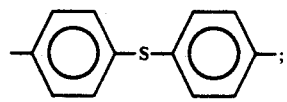

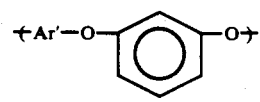

wherein Ar' represents 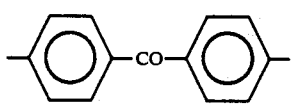

14. The resin composition as claimed in claim 13, wherein the polycyanoarylether has a reduced viscosity of 0.6 to 1.5 dl/g and the carbonized phenolic resin has a specific surface of not more than 250 m²/g and a mean particle size of 15 to 20 μm.

15. The resin composition as claimed in claim 5, wherein the carbonized phenolic resin has a specific surface of not more than 250 m²/g and a mean particle size of 15 to 20 μm, and the non-fibrous solid lubricant is selected from the group consisting of a homopolymer of tetrafluoroethylene, a copolymer of tetrafluoroethylene, a copolymer of tetrafluoroethylene and hexafluoropropylene, a polymer of chlorotrifluoroethylene and a polymer of vinylidene fluoride, said non-fibrous solid lubricant having a mean particle size of 5 to 20 μm.

16. The resin composition as claimed in claim 9, wherein the carbonized phenolic resin has a specific surface of not more than 250 m²/g and a mean particle size of from 15 to 20 μm, the non-fibrous solid lubricant is a fluorocarbon resin and the fibrous reinforcing material is at least one fiber material selected from the group consisting of carbon fibers, aramid fibers, and potassium titanate fibers.

17. The resin composition as claimed in claim 16, wherein the carbonized phenolic resin is present in the resin composition in an amount of from 10 to 20% by weight, the non-fibrous solid lubricant is present in the resin composition in an amount of from 10 to 20% by weight, and the fibrous reinforcing material is present in the resin composition in an amount of from 20 to 30% by weight on the total basis of the total of the amounts of the polycyanoarylether, the carbonized phenolic resin, the non-fibrous solid lubricant and the fibrous reinforcing material.

18. The resin composition as claimed in claim 17, wherein the non-fibrous solid lubricant is polytetrafluoroethylene having a mean particle size of 5 to 20 μm and the fibrous reinforcing material is a carbon fiber having a fiber diameter of 5 to 20 μm and a fiber length of 0.1 to 10 mm.

19. The resin composition as claimed in claim 17, wherein the non-fibrous solid lubricant is polytetrafluoroethylene having a mean particle size of 5 to 20 μm and the fibrous reinforcing material is an aramid fiber having a diameter of 7 to 15 μm and a fiber length of 0.1 to 10 mm.

20. The resin composition as claimed in claim 17, wherein the non-fibrous solid lubricant is polytetrafluoroethylene having a mean particle size of 5 to 20 μm and the fibrous reinforcing material is a potassium titanate fiber having a mean fiber length of 20 to 50 μm and a mean fiber diameter of 0.1 to 0.5 μm.

* * * * *